(12) United States Patent
Hedman

(10) Patent No.: US 7,347,170 B2
(45) Date of Patent: Mar. 25, 2008

(54) FREQUENCY MODULATED VCR-ENGINE

(75) Inventor: Mats Hedman, Sparreholm (SE)

(73) Assignee: Cargine Engineering AB, Helsingborg (SE)

( * ) Notice: Subject to any disclaimer, the term of this patent is extended or adjusted under 35 U.S.C. 154(b) by 71 days.

(21) Appl. No.: 10/533,773

(22) PCT Filed: Oct. 29, 2003

(86) PCT No.: PCT/SE03/01670

§ 371 (c)(1),
(2), (4) Date: May 4, 2005

(87) PCT Pub. No.: WO2004/042216

PCT Pub. Date: May 21, 2004

(65) Prior Publication Data

US 2006/0107911 A1 May 25, 2006

(30) Foreign Application Priority Data

Nov. 4, 2002 (SE) .................................. 0203257

(51) Int. Cl.
*F02D 15/00* (2006.01)
*F02B 69/06* (2006.01)

(52) U.S. Cl. .................................. 123/48 R; 123/21

(58) Field of Classification Search ............... 123/21, 123/48 R, 48 A, 27 R, 90.15
See application file for complete search history.

(56) References Cited

U.S. PATENT DOCUMENTS

| 5,377,631 A | 1/1995 | Schechter |
| 6,523,504 B2 * | 2/2003 | Miura .......................... 123/21 |
| 6,581,551 B1 * | 6/2003 | Denbratt .................... 123/48 R |
| 6,615,771 B2 * | 9/2003 | Denger et al. ................ 123/21 |
| 6,619,242 B2 * | 9/2003 | Kaneko ....................... 123/21 |

FOREIGN PATENT DOCUMENTS

| WO | WO 9942718 | 8/1999 |
| WO | WO 0028198 | 5/2000 |

* cited by examiner

*Primary Examiner*—Stephen K. Cronin
*Assistant Examiner*—Hyder Ali
(74) *Attorney, Agent, or Firm*—Young & Thompson

(57) ABSTRACT

A control method for the modulation of the torque of piston combustion engine that has a compression chamber (6) of variable volume and operable inlet valves (3). The torque requested for a predetermined operative condition is obtained through a selection of the volume of the compression chamber (6) combined with a selection of the time of opening and the time of closure of the inlet valves (3) combined with a selection of the frequency with which power strokes are performed.

11 Claims, 2 Drawing Sheets

FREQUENCY MODULATED VCR-ENGINE

THE FIELD OF THE INVENTION

The present invention relates to a control method for the modulation of the torque of a piston combustion engine that has a compression chamber with variable volume and operable inlet valves.

The invention is applicable to engines subjected to a variable load, such a Otto- and diesel engines for the propelling of vehicles, aeroplanes, boats, ships, etc. and for the operation of compressors, hydraulic pumps and electric generators, etc.

The invention requires the use of a control system. The software of the control system determines the function thereof. The software by means of which the invention is put into practice may, for example, be applied as a part of a larger control system used for controlling also other properties and parameters of the engine in question.

THE BACKGROUND OF THE INVENTION

During the last decades the internal combustion engines have been developed towards an improved operation economy and a reduced environmental impact by the introduction of digital control systems for, for example, fuel injection and ignition.

However, in spite of said improvements, it is still a problem that the varying operation conditions result in the average efficiency being low and the effect of the environment being large. The composition of the exhaust gas emissions also varies, making it difficult to clean the exhaust gases.

It is well known that a Variable Compression Ratio (VCR) improves the efficiency. It is also well known that the introduction of freely operable valves, so called Variable Valve Actuators (VVA), results in the possibility of a change from throttle regulation to earlier closure of the inlet valves during the inlet stroke, so called Miller cycle, and the possibility of total cylinder closure during a time as short as one engine revolution, also called a Frequency modulated Torque or Skip Cycle, which results in a substantially improved efficiency. It is also a fact that it will be possible to change between 2-stroke cycles and 4-stroke cycles by the use of VVA.

THE OBJECT OF THE INVENTION

It is an object of the present invention to present a control method for the modulation of the torque of a piston combustion engine that has a compression chamber with variable volume and that has operable valves, that reduces the drawbacks mentioned above and results in a better efficiency and a lower impact on the environment.

SUMMARY OF THE INVENTION

The object of the invention is achieved by means of the method as initially defined, characterized in that the torque requested for a predetermined operative condition is obtained through a selection of the volume of the compression chamber combined with a selection of the time of opening and the time of closure of the inlet valves combined with a selection of the frequency with which power strokes are performed.

As far as the inventor knows, no one has previously suggested to combine, in one and the same engine, the VCR- and WA-techniques. Preferably, a maximum compression volume is applied upon maximum load. Upon a reduction of the load, the compression volume is reduced while, simultaneously, an earlier closure of the inlet valves is applied until the efficiency is optimal, that is at a maximum with regard taking to any relevant condition. Upon a continuously reduced load, a Frequency modulated Torque is applied, by which the requested load is achieved as the control system selects a frequency of power strokes the feature, or parameters, of which are maintained from the load level at which an optimal power efficiency has been obtained. If a large torque is requested at a low number of revolutions per minute, 2-stroke cycles are, preferably, used. As VCR, according to the invention, is combined with the VVA, synergy effects such as a higher reduction of fuel consumption than the sum of reduction of fuel consumption that can be achieved by means of VCR or VVA individually is obtained.

Variable Compression Ratio, VCR, is referred to as a variation of the volume between the piston and the cylinder ceiling at the upper dead point of the piston.

Operable valves, or Variable Valve Actuators, VVA, are referred to as valves the opening and closure times of which and the valve lift of which or area of which is controlled by means of valve actuators that are activated by signals from a valve control system. Operable valves have valve actuators that are activated pneumatically, hydraulically, electromagnetically or in any other similar way.

Power stroke is referred to as a stroke upon which the energy of a mass of gas expanding during combustion is transferred to mechanical work. Power strokes may be included in cycles that are optimal or normal as in today's engines.

An idle stroke is referred to as a stroke without any gas exchange, air supply or combustion during which no positive work is performed. Upon such a stroke, there is a minimum of losses due to friction and heat losses. During the execution of an idle stroke no air or air together with fuel is pumped through the engine. An idle stroke presupposes that at least the inlet valves are operable in order to be kept closed during the idle stroke for the purpose of preventing air from being supplied until the moment they are reopened. However, according to the invention, it is preferred that also the outlet valves are operable.

The frequency of the power strokes may vary between 0 and 100 percent of the revolution per minute of the engine. The frequency can be selected by determining that a power stroke is to be performed each n engine revolution, the remaining strokes being idle strokes. Alternatively it is determined that a series of power strokes are to be performed and that an idle stroke is performed each n engine revolution. The requested torque is registered by a sensor and transmitted to the control system, that select a frequency by which the power strokes are to be performed.

An optimal power stroke is referred to as a stroke during which the work that is performed is as large as possible with due regard taking to the economical and environmental conditions that are set and with regard to the fuel consumption. By providing the requested torque by a selection of the frequency by which optimal power strokes are performed, a best possible operation economy is achieved.

During a 4-stroke cycle an optimal power stroke includes an early closure of the inlet valves, a Miller cycle, in relation to what is common in today's engines, and the opening of the outlet valves is delayed, Atkinson's cylcle, compared to what is comma use. The volume of the compression chamber is selected for the purpose of obtaining the best possible result under the given conditions, resulting in a compression chamber volume of approximately 20%-80% of the maximum compression chamber volume, and preferably 30%-50% of said maximum volume.

By means of engine experiment it is possible to determine the values of the relevant parameters at each number of revolutions per minute of the engine. Alternatively, the control system may be adaptive, i.e. self-teaching.

An optimal power stroke during a 2-stroke cycle differs from an optimal power stroke during a 4-stroke cycle since the cylinder pressure that exists when the outlet valves are opened is to be used for the purpose of performing a gas exchange. Rapidly opened outlet valves results in a pulse of exiting exhaust gases, which, in its turn, creates a low pressure, a pressure below 1 atmosphere, in the cylinder. The outlet valves are closed and, subsequently, the inlet valves are opened at such a time in relation thereto that the closure of the outlet valves and low pressure is fully taken advantage of in order to supply a correct amount of air before the next compression stroke and the following power stroke. Optimal power strokes can also be performed by the use of outlet ports that are exposed, left open, in connection to the lower dead point of the piston.

During a 2-stroke cycle, a flushing pump may be used in order to fully or partly, and then in combination with the low pressure in the cylinder, responsible for the gas exchange.

At certain operation conditions, it might be necessary to depart from the optimal power strokes, for example when a maximum effect is requested or upon other delimiting conditions.

An engine and the control system thereof may be designed in order to permit more than one set of optimal power stroke parameters at a predetermined number of revolutions per minute of the engine, by the use of two or more types of fuels that, because of their different properties, result in different optimal power strokes. Fuels as petrol and ethanol are examples of such a combination. Upon each number of revolutions per minute, there is one set of optimal power stroke parameters for petrol and another for ethanol.

According to the invention, the systems for the supply of air and fuel are preset such that, at each power stroke, and at a certain number of revolutions per minute, the same masses of air and fuel and the same mixture of air and fuel as in the other power strokes at that number of revolutions per minute are used for the combustion. Furthermore, any possible amount of recycled exhaust gas, EGR is equal for the power strokes. Since the combustion conditions, accordingly, are repeated and remain the same, this results in each power stroke, upon as predetermined number of revolutions per minute, performing an equal amount of work, and the chemical composition of the exhaust gases remaining the same, resulting in a facilitated exhaust gas cleaning.

In common piston combustion engines operating with 4-stroke cycles, the combustion of a power stroke takes place each second revolution, and in an engine operating with 2-stroke cycles, it takes place each revolution. The gas exchange systems of these engines result in other stroke intervals being unsuitable, since air, rests of fuel, for example non-combusted hydrocarbons, are pumped through the engine, resulting in lower efficiency and an impact on the environment. In order to make use of the invention and the advantages obtained thereby, valves and ports for the purpose of gas exchange must be able to be closed during one or more consecutive idle strokes, which is often the case upon partial loads. Accordingly, the invention requires operable valves, at least operable inlet vales.

By using operable valves, by which the opening and closure of the valves and, possible, the valve lift is controlled by means of a digital control system with sensors for sensing the crankshaft position and/or the piston position and the number of revolutions per minute, and any electronics associated thereto, and a software, gas exchanges and power strokes can be performed only upon need thereof. For the rest of the time, the valves, at least the inlet valves, are kept closed. This means that the frequency of optimal power strokes is chosen in order to achieve the requested torque.

The control method uses a digital control system that senses the requested torque at each moment. If this torque is within the region in which it can be achieved by means of optimal power strokes, preferably from idling up to 50% load, then a certain frequency of power strokes, the one that is supposed to provide the requested torque, is selected by the control system. At a predetermined number of revolutions per minute, the power strokes provide the same amount of work each time they are performed. Therefore, it is the frequency of power strokes that is decisive for the torque value.

Operable valves permit the supply of air and fuel and the removal of exhaust gases, gas exchange, immediately before and after the power strokes. In order to select a frequency for which a power stroke is performed each revolution, gas exchange has to take place each revolution, as in a 2-stroke engine. Gas exchange can also be performed as in contemporary 4-stroke engines, i.e. by applying an intake stroke, resulting in a power stroke being performed each second revolution. According to the invention the required torque is provided through a selection of a frequency of 2-stroke cycles or 4-stroke cycles or through a frequency by which one ore more 2-stroke cycles are mixed with one or more 4-stroke cycles. According to the invention, different frequencies of power strokes can be selected for different engine cylinders. If the inlet valves are operable, but not the outlet valves, then only 4-stroke cycles are possible to perform.

The control system is arranged to, as an answer to a request for increased or decreased torque from a driver, for example by use of a gas pedal in a common or in a similar way, control the proportion of power strokes in relation to the number of idle strokes of the engine. Thereby, the power strokes are optimised, in accordance with the above definition, as the control system is also arranged to control the volume of the compression chamber within the controllable interval, as well as the amount of air that is supplied by choosing the time for opening and closure of the inlet valves, and, possibly, the valve lift.

The engine is controlled through a variation of the number of power strokes in relation to the number of idle strokes for each cylinder, and by having a different variation from cylinder to cylinder. The control system controls the engine by controlling the opening and closure of the inlet valves and outlet valves to the combustion chamber of each cylinder respectively, or the opening and closure of only the inlet valves, if the outlet valves are not operable. The opening and closure of the inlet valves, and possible also the outlet valves, is thus based on the torque requested by the driver. The control is executed by means of control signals from a control unit of the control system. If the outlet valves are not operable, the power strokes have to be applied to 4-stroke cycles. If both the inlet and the outlet valves are operable valves, the control system can be arranged to change between 4-stroke cycles and 2-stroke cycles for the cylinders of the engine. For example, one cylinder might operate with 2-stroke cycles and another one with 4-stroke cycles. The control system should be arranged to calculate under what conditions 2-stroke cycles or 4-stroke cycles are most efficient in order to, on basis thereof, choose one of the cycles and apply a certain frequency of power strokes. Accordingly, the control method includes a choice between 2-stroke cycles and 4-stroke cycles on basis on these given conditions. The control system comprises a control unit that includes a computer program for this purpose, arranged in a data carrier. The control unit is operatively connected with a circuit for, for example, pneumatic, hydraulic, electromagnetic or any other type of activation of actuators that control at least the inlet valves, but possible also the outlet valves. The control unit may, for example, be arranged to control solenoids arranged in the circuit for the activation of actuators that act on the inlet valves or outlet valves of the engine. The control unit is operatively connected with a member for providing a torque request, for example a gas pedal by means of which a driver gives an order concerning the increase or reduction of the torque of the engine. The control system for a frequency modulated torque may be a part of a system, for example a part corresponding to an economy drive mode, in a larger control system that also controls other properties or parameters of the engine in question.

The lower the load, the larger the relative reduction of fuel consumption and reduction of the environmental impact achieved by implementation of the invention. An engine and its control system may be designed in order to cover the whole operation interval of the engine with different frequencies of optimal power strokes as the one and only control feature.

Without departing from the invention, only air, or a combination of fuel and air, can be supplied to and be accommodated in the cylinder during one or more revolution in order to, for example, improve the mixing and/or the gasification of the fuel. The invention is not delimited to a selection of absolute optimal power strokes or the selection of the most proper frequency.

BRIEF DESCRIPTION OF AN EMBODIMENT

Figure 1:
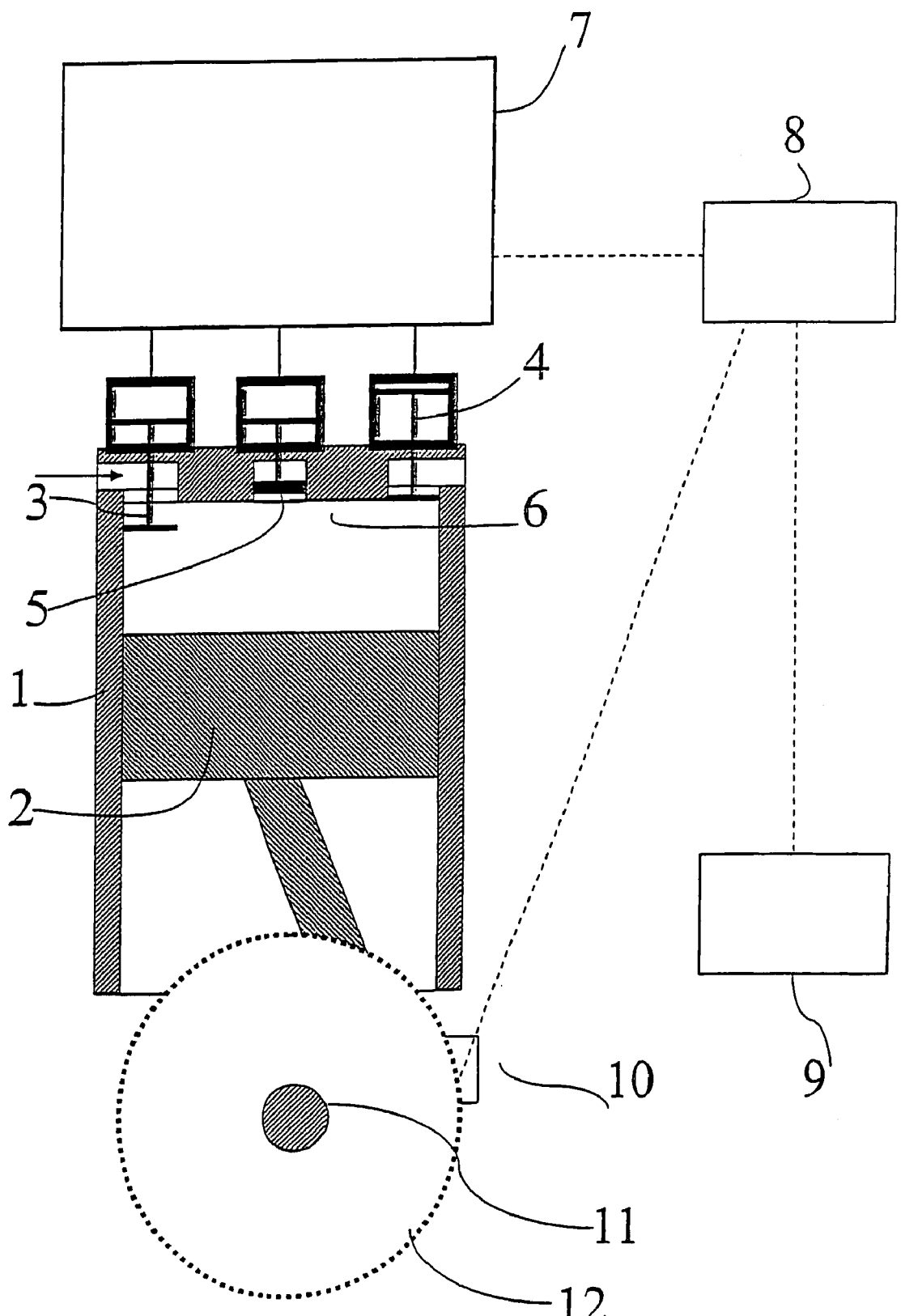
FIG. 1 is an exemplifying, schematic view of an engine onto which the inventive method is implemented.
Figure 2:
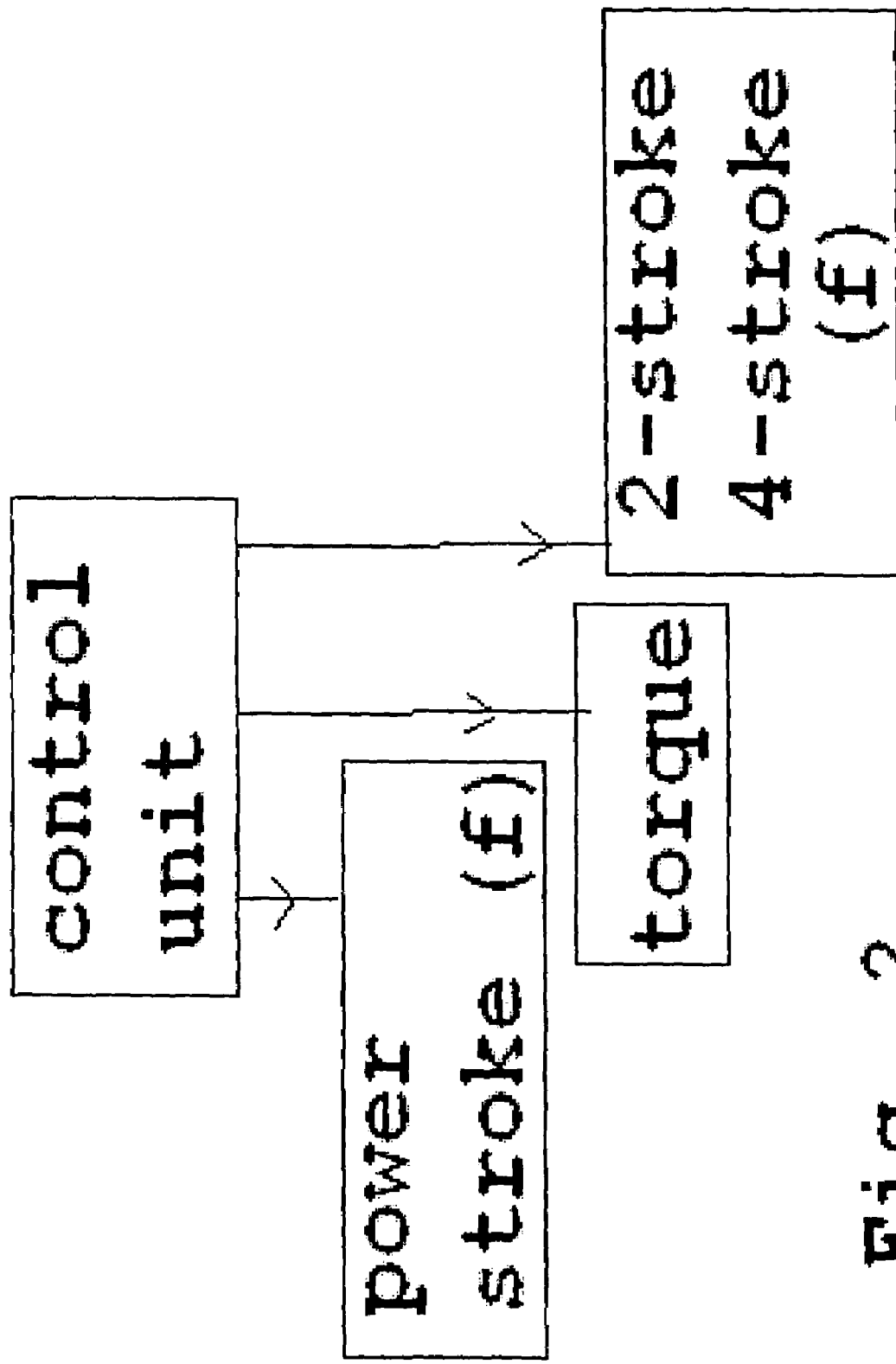
FIG. 2 shows various operations controlled by the control unit.

FIG. 1 is an exemplifying, schematic view of a cylinder 1 with a piston 2. The piston 2 is moving during an intake stroke of a 4-stroke cycle, and air is flowing, possibly together with fuel, through an open inlet valve 3. An outlet valve 4 is closed. AVCR-piston 5 is used for varying the volume of the compression chamber 6, said volume being the volume between the piston 2 and the ceiling of the cylinder 1 at the upper dead point of the piston 2. A pneumatic circuit 7 is used for the activation of actuators for operating the valves 3 and 4 and the 20VCR-piston 5. A control unit 8 is operatively connected with the circuit 7 for the purpose of controlling, by means of signals, the circuit and the valves 3 and 4 connected with the circuit 7, as well as the VCR-piston 5. A member 9, for example a gas pedal, is operatively connected with the control unit 8 for the purpose of providing a torque order. A sensor 10, arranged at a graded disc 12 mounted on the crankshaft 11, is operatively connected with the control unit 8, and provide the latter with information about the number of revolutions per minute and the crankshaft position and/or the position of the piston 2 in the cylinder 1. Based on the requested torque and other information sent to the control unit 8, the control unit 8 selects a frequency with which power strokes are performed. The control unit 8 also decides when the operable valves 3 and 4 shall open or close, and in which position the VCR-piston 5 should be when the piston 2 is in its upper dead position. The operable valves 3 and 4 are, for example, electromagnetically, hydraulically or pneumatically activateble. The VCR-piston 5 is, for example, mechanically, hydraulically or pneumatically moveable. The VCR-piston 5 may be connected to the crankshaft 11, not shown in this figure, and it might be arranged to perform a variable reciprocating movement of the VCR-piston in coordination with the movement of the piston 2, in order to accomplish and optimum compression. In an automatical control system the VCR-piston 5 may also continuously seek a position in which it accomplishes an optimum compression.

The invention claimed is:

1. A control method for modulation of torque of a piston combustion engine that has a compression chamber of variable volume and operable inlet valves, wherein torque requested for a predetermined operative condition is obtained through a selection of a volume of a compression chamber combined with a selection of the time of opening and the time of closure of the inlet valves combined with a selection of the frequency with which power strokes are performed, and wherein
   at maximum load, the maximum compression chamber volume is applied,
   upon reduced load, the compression chamber volume is reduced and the closure of the inlet valves is performed earlier, and
   upon a further reduction of the load, the selection of the frequency of power strokes is performed.

2. A control method according to patent claim 1, wherein the selection of the frequency of power strokes is performed from idling up to 50% of maximum load.

3. A control method according to claim 1, wherein the outlet valves are operable and that the volume of the compression chamber is selected in combination with a selection of the times for opening and closure of the inlet valves as well as the outlet valves and in combination with the selection of the frequency by which the power strokes are performed.

4. A control method according to claim 1, wherein the engine has a plurality of cylinders and that a different frequency of power strokes are chosen for different cylinders.

5. A control method according to claim 1, wherein the power strokes are performed with early closure of the inlet valves.

6. A control method according to claim 3, wherein the power strokes are performed with delayed opening of the outlet valves.

7. A control method according to claims 1, wherein the volume of the compression chamber is controlled to be 20%-80% of the maximum volume thereof as the frequency of power strokes is selected.

8. The control method according to claim 1, wherein the volume of the compression chamber is 30%-50% of the maximum volume thereof as the frequency of power strokes is selected.

9. The control method according to claim 1, wherein, at each power stroke, upon a predetermined number of revolutions per minute, which is independent of the torque, generally equal masses of air and fuel, and generally the same proportion of air and fuel is ignited as in the other power strokes.

10. The control method according to claim 3, wherein 2-stroke cycles or 4-stroke cycles are selected upon a bases of the required torque, and the power strokes are performed in 2-stroke cycles as well as 4-stroke cycles.

11. The control method according to claim 1, comprising a control system with a computer program that, by signal control upon basis of a torque request from driver, selects frequency of power strokes, valve times, lifting of the valve, the volume of the compression chamber and operation with 2-stroke cycles or 4-stroke cycles.

* * * * *